US012559139B2

(12) United States Patent
Futagami et al.

(10) Patent No.: US 12,559,139 B2
(45) Date of Patent: Feb. 24, 2026

(54) AUTONOMOUS DRIVING CONTROL APPARATUS

(71) Applicant: TOYOTA JIDOSHA KABUSHIKI KAISHA, Toyota (JP)

(72) Inventors: Kosuke Futagami, Mishima (JP); Ryosuke Hata, Mishima (JP); Yosuke Hirate, Kariya (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 18/529,605

(22) Filed: Dec. 5, 2023

(65) Prior Publication Data

US 2024/0190472 A1      Jun. 13, 2024

(30) Foreign Application Priority Data

Dec. 9, 2022      (JP) ................................. 2022-196896

(51) Int. Cl.
*B60W 60/00*           (2020.01)

(52) U.S. Cl.
CPC ............................... *B60W 60/0018* (2020.02)

(58) Field of Classification Search
CPC ........... B60W 30/182; B60W 60/0059; B60W 60/00; B60K 2360/172; G05D 1/0088
See application file for complete search history.

(56) References Cited

U.S. PATENT DOCUMENTS

| | | | | |
|---|---|---|---|---|
| 10,464,575 B2 * | 11/2019 | Abe | ................. | B60W 50/0098 |
| 10,996,671 B2 * | 5/2021 | Zaizen | ................. | G05D 1/0088 |
| 2016/0313738 A1 | 10/2016 | Kindo et al. | | |
| 2018/0113460 A1 * | 4/2018 | Koda | ................. | G08G 1/09685 |
| 2018/0292833 A1 * | 10/2018 | You | ..................... | G05D 1/0212 |
| 2019/0235510 A1 * | 8/2019 | Hashimoto | ......... | B60W 50/082 |
| 2019/0248369 A1 * | 8/2019 | Mizuno | ................. | B60W 50/00 |
| 2019/0286140 A1 * | 9/2019 | Miura | ................. | G05D 1/0061 |
| 2020/0133264 A1 | 4/2020 | Matsunaga | | |

(Continued)

FOREIGN PATENT DOCUMENTS

| | | | | | |
|---|---|---|---|---|---|
| DE | 102018205012 A1 * | 10/2019 | ...... | B60W 60/00186 |
| DE | 102018220267 A1 * | 5/2020 | ........ | B60W 60/0051 |

(Continued)

*Primary Examiner* — Khoi H Tran
*Assistant Examiner* — Dairon Estevez
(74) *Attorney, Agent, or Firm* — Sughrue Mion, PLLC

(57)      ABSTRACT

The autonomous driving control apparatus includes a driving control unit capable of executing a first autonomous driving mode and a second autonomous driving mode having a higher travel performance than the first autonomous driving mode, a parameter changing unit changing at least a part of a control parameter of autonomous driving to a control parameter for executing the second autonomous driving mode during execution of the first autonomous driving mode, and a performance determination unit determining whether travel performance of an autonomous driving vehicle satisfies travel performance required for the second autonomous driving mode after change of the control parameter. When it is determined that the travel performance required for the second autonomous driving mode is satisfied, the driving control unit switches to the second autonomous driving mode.

4 Claims, 5 Drawing Sheets

(56)        References Cited

U.S. PATENT DOCUMENTS

| 2021/0286364 | A1 | | 9/2021 | Sakai | |
| 2023/0311929 | A1 | * | 10/2023 | Laws | B60W 50/029 |
| | | | | | 701/23 |
| 2023/0339515 | A1 | * | 10/2023 | Hayakawa | B60W 30/182 |
| 2025/0319907 | A1 | * | 10/2025 | Song | B60W 30/182 |

FOREIGN PATENT DOCUMENTS

| JP | 2013-56667 | A | | 3/2013 | |
| JP | 2016-203882 | A | | 12/2016 | |
| JP | 6597516 | B2 | | 10/2019 | |
| JP | 2020-067962 | A | | 4/2020 | |
| JP | 2021-14239 | A | | 2/2021 | |
| JP | 2021-148462 | A | | 9/2021 | |
| KR | 20200010654 | A | * | 1/2020 | G05D 1/0231 |

* cited by examiner

AUTONOMOUS DRIVING CONTROL APPARATUS

CROSS-REFERENCE TO RELATED APPLICATIONS

This application is based upon and claims the benefit of priority from Japanese Patent Application No. 2022-196896, filed on Dec. 9, 2022. The entire contents of which are incorporated herein by reference.

TECHNICAL FIELD

The present disclosure relates to an autonomous driving control apparatus that controls autonomous driving of a movable object.

BACKGROUND

There is an autonomous driving control apparatus capable of switching between two autonomous driving modes having different travel performances as control of autonomous driving of a movable object. As an example of such an autonomous driving control apparatus, for example, JP 2020-67962 A describes switching between an autonomous driving mode that requires monitoring by a driver and an autonomous driving mode that does not require monitoring by a driver.

SUMMARY

Here, the autonomous driving control apparatus may switch the autonomous driving mode of the movable object from the first autonomous driving mode to the second autonomous driving mode having a higher travel performance than the first autonomous driving mode. In this case, after the autonomous driving mode is switched, it may be considered that the movable object cannot satisfy the travel performance obtained in the second autonomous driving mode due to various factors such as a sensor abnormality. Accordingly, it may be considered that the movable object cannot appropriately travel.

For this reason, the present disclosure describes an autonomous driving control apparatus capable of causing a movable object to appropriately travel after switching even when the autonomous driving mode is switched.

An autonomous driving control apparatus according to an aspect of the present disclosure controls autonomous driving of a movable object. The autonomous driving control apparatus includes a driving control unit, a parameter changing unit, and a performance determination unit. The driving control unit may execute a first autonomous driving mode and a second autonomous driving mode having a travel performance higher than that of the first autonomous driving mode as autonomous driving control. The parameter changing unit changes a control parameter for executing the high-level autonomous driving mode while the driving control unit is executing the first autonomous driving mode. The high-level autonomous driving mode has higher travel performance than the first autonomous driving mode for at least a part of a control parameter for performing autonomous driving. After the control parameter is changed, the performance determination unit determines whether the travel performance of the movable object corresponding to the changed control parameter satisfies the travel performance required for the high-level autonomous driving mode. When it is determined by the performance determination unit that the travel performance of the movable object satisfies the travel performance required for the high-level autonomous driving mode during execution of the first autonomous driving mode, the driving control unit switches the control of autonomous driving from the first autonomous driving mode to the second autonomous driving mode.

In the autonomous driving control apparatus, the parameter changing unit may change, as a control parameter to be changed, a parameter for causing the movable object to follow the target path and target speed of the movable object.

In the autonomous driving control apparatus, the performance determination unit may perform the determination using, as the travel performance, at least one of a deviation of an actual speed with respect to a target speed of the movable object, a deviation of an actual acceleration with respect to a target acceleration of the movable object, a deviation of an actual lateral position or yaw angle with respect to a target path of the movable object, stability of path following control when controlling a path of the movable object to be the target path of the movable object, and stability of speed following control when controlling a speed of the movable object to be the target speed of the movable object.

According to an aspect of the present disclosure, even when control of autonomous driving is switched, it is possible to cause a movable object to appropriately travel after switching.

DETAILED DESCRIPTION

In the following description, with reference to the drawings, the same reference numbers are assigned to the same components or to similar components having the same function, and overlapping description is omitted.

First Embodiment

Figure 1:
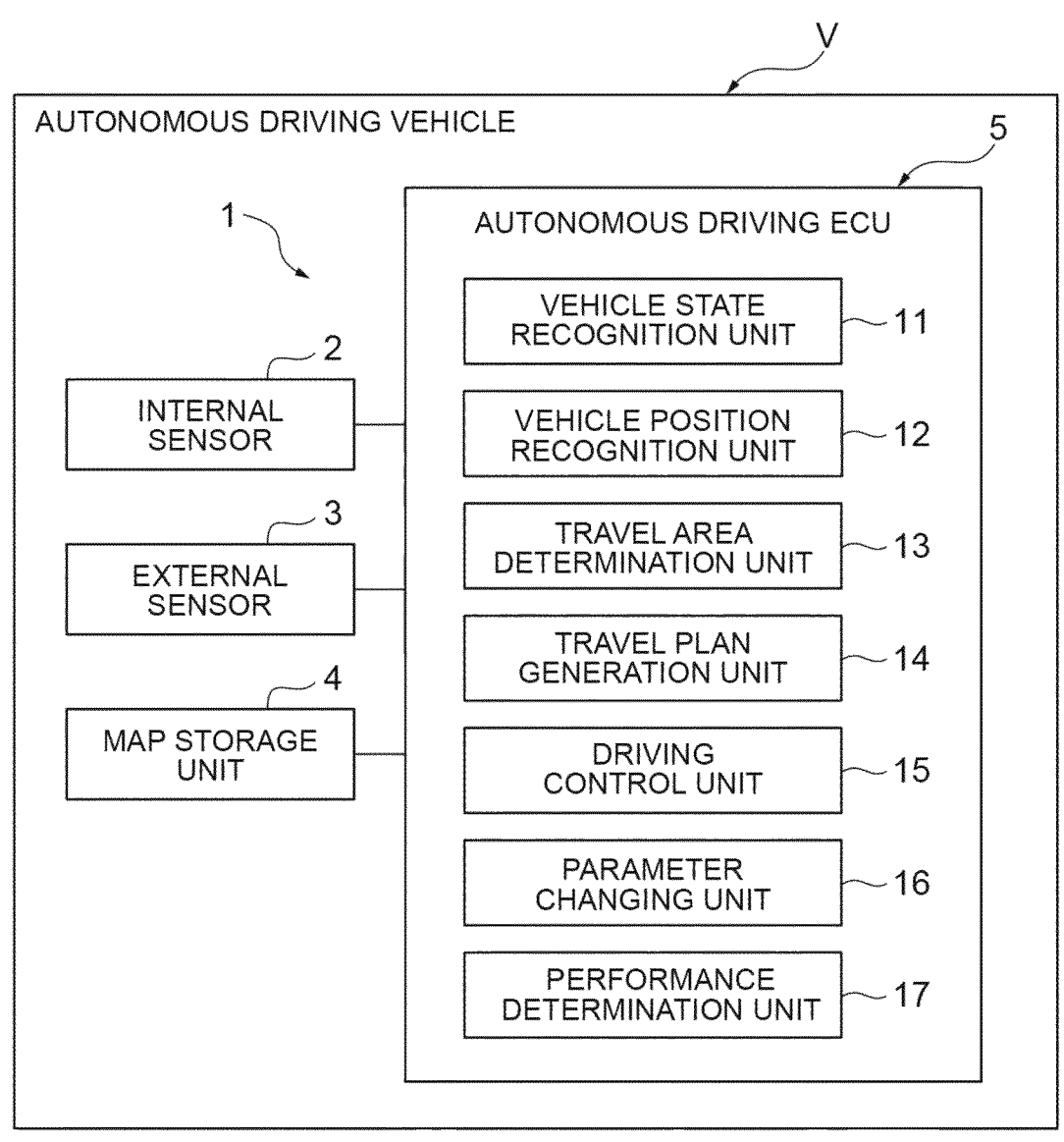
FIG. 1 is a block diagram illustrating an example of an autonomous driving control apparatus according to a first embodiment.

First, a first embodiment of the autonomous driving control apparatus will be described. As shown in FIG. 1, an autonomous driving control apparatus 1 according to the present embodiment controls autonomous driving of an autonomous driving vehicle (movable object) V. The autonomous driving control apparatus 1 can execute a first autonomous driving mode and a second autonomous driving mode in which travel performance is higher than that in the first autonomous driving mode as control of autonomous driving. The high travel performance means that the tracking performance for the target control value is high.

As an example, the first autonomous driving mode may be a driving mode that needs to be monitored by a driver. As an example, in the first autonomous driving mode, a driving operation by a driver may be requested as necessary. In other words, the first autonomous driving mode may be a mode in which the driver can intervene in the driving maneuver of an autonomous driving vehicle V using at least a deviation of the accelerator, brake pedal, and steering wheel.

As an example, the second autonomous driving mode may be a driving mode in which monitoring by the driver is unnecessary. As an example, in the second autonomous driving mode, the driving operation by the autonomous driving control apparatus 1 is prioritized, and the driving operation performed by the driver may not be reflected in the motion of the autonomous driving vehicle V. In other words, the second autonomous driving mode may be a mode in which the driver and the occupant are not expected to intervene in the driving operation of the autonomous driving vehicle V. The second autonomous driving mode has a travel performance higher than that of the first autonomous driving mode. For this reason, the second autonomous driving mode may be referred to as a mode in which the driving operation by the driver and the occupant does not need to be intervened or may be less intervened, as an example.

In the following description, control in which the autonomous driving control apparatus 1 switches the control of autonomous driving of the autonomous driving vehicle V from the first autonomous driving mode to the second autonomous driving mode will be mainly described. The autonomous driving control apparatus 1 has an internal sensor 2, an external sensor 3, a map storage unit 4, and an autonomous driving ECU 5 [Electronic Control Unit].

The internal sensor 2 is an on-vehicle sensor that detects the travel state of the autonomous driving vehicle V. The internal sensor 2 may include, for example, a vehicle speed sensor that detects the speed of the autonomous driving vehicle V, an acceleration sensor that detects acceleration of the autonomous driving vehicle V, and a yaw rate sensor that detects a yaw rate in the autonomous driving vehicle V. The external sensor 3 is an on-vehicle sensor that detects the external environment of the autonomous driving vehicle V. The external sensor 3 includes, for example, a camera, a millimeter wave radar, and a light detection and ranging (LIDAR) and/or the like. The map storage unit 4 is a data base that stores map information. The map information includes position information of road, information of road shape, and position information of fixed obstacle such as utility pole. The map storage unit 4 may be provided in a computer of a facility such as an information processing center capable of communicating with the autonomous driving vehicle V.

The autonomous driving ECU 5 is an electronic control unit having, for example, a CPU [Central Processing Unit], ROM [Read Only Memory], RAM [Random Access Memory], and the like. For example, The autonomous driving ECU 5 loads a program stored in the ROM into the RAM. The autonomous driving ECU 5 realizes various functions by executing the program loaded into the RAM by the CPU. The autonomous driving ECU 5 may be comprised of a plurality of electronic control units. The autonomous driving ECU 5 functionally includes a vehicle state recognition unit 11, a vehicle position recognition unit 12, a travel area determination unit 13, a travel plan generation unit 14, a driving control unit 15, a parameter changing unit 16, and a performance determination unit 17.

The vehicle state recognition unit 11 recognizes the autonomous driving vehicle V travel state, such as the autonomous driving vehicle V speed and orientation, based on the internal sensor 2 detection result. The vehicle position recognition unit 12 recognizes the position of the autonomous driving vehicle V on the map. For example, the vehicle position recognition unit 12 may recognize a location on a map of the autonomous driving vehicle V based on position information received in GPS receiving unit and map information stored by the map storage unit 4. In addition, the vehicle position recognition unit 12 may recognize the location of the autonomous driving vehicle V by using position information of fixed obstacle such as utility pole included in map information of the map storage unit 4 and a detection result of the external sensor 3 through the existing SLAM technology.

The travel area determination unit 13 determines whether the autonomous driving vehicle V has entered the second operation area from the first operation area. The first operation area is an area in which the autonomous driving vehicle V is driven in the first autonomous driving mode. The second operation area is an area where v can be driven in the second autonomous driving mode. Here, the first operation area and the second operation area are predetermined. In the second operation area, traveling in the second autonomous driving mode is allowed in addition to the first autonomous driving mode. For example, the information of the first operation area and the second operation area may be included in the map information stored by the map storage unit 4. In this case, the travel area determination unit 13 may determine whether the autonomous driving vehicle V has entered the second operation area from the first operation area based on position information of the autonomous driving vehicle V recognized in the vehicle position recognition unit 12 and map information stored in the map storage unit 4. Further, the driver (occupant) may instruct the autonomous driving control apparatus 1 whether or not the second operation area is entered. In this case, the travel area determination unit 13 may determine whether or not the autonomous driving vehicle V has entered the second operation area from the first operation area based on an input operation of an instruction from a driver (occupant) of the autonomous driving vehicle V.

The travel plan generation unit 14 generates a plan of the autonomous driving vehicle V based on the position of the autonomous driving vehicle V recognized in the vehicle position recognition unit 12, the external environment of the autonomous driving vehicle V detected in the external sensor 3, and the like. The travel plan is a plan for automatically running the autonomous driving vehicle V from the current position of the autonomous driving vehicle V to a preset destination. The travel plan includes a target trajectory of the autonomous driving vehicle V corresponding to the position of the autonomous driving vehicle V on the target route. The target trajectory includes the target path of the autonomous driving vehicle V and the target speed at each position on the target path.

In the second operation area, traveling in the second autonomous driving mode is also allowed. For this reason, as an example, the travel plan generation unit 14 may generate a plan for performing the first autonomous driving mode and a plan for performing the second autonomous driving mode when the autonomous driving vehicles V enter the second operation area or while traveling in the second operation area.

The driving control unit 15 controls autonomous driving of the autonomous driving vehicle V so as to follow the travel plan based on the travel plan generated by the travel plan generation unit 14. Here, the driving control unit 15 causes the autonomous driving vehicle V to travel automatically by transmitting control signals to various actuators for performing driving operations of the autonomous driving vehicle V.

The driving control unit 15 switches between a first autonomous driving mode and a second autonomous driving mode. The driving control unit 15 can perform either the first autonomous driving mode and the second autonomous driving mode. When the driving control unit 15 executes the second autonomous driving mode, the autonomous driving of the autonomous driving vehicle V is controlled such that the travel performance is higher than that when the first autonomous driving mode is executed. The driving control unit 15 executes the first autonomous driving mode in the first operation area. When the autonomous driving vehicle V enters the second operation area from the first operation area, the driving control unit 15 executes the second autonomous driving mode based on the determination result of the performance determination unit 17. Details of switching to the second autonomous driving mode based on the determination result of the performance determination unit 17 will be described later.

The parameter changing unit 16 changes at least a part of the control parameter for the driving control unit 15 to perform autonomous driving while the driving control unit 15 is performing the first autonomous driving mode. It should be noted that the parameter changing unit 16 may change only a part of the control parameter for the driving control unit 15 to perform autonomous driving, instead of the entire control parameter.

Here, the parameter changing unit 16 changes the control parameter to a control parameter for executing a high-level autonomous driving mode in which travel performance is higher than that of the first autonomous driving mode. In the present embodiment, the high-level autonomous driving mode is set to the second autonomous driving mode. That is, in the present embodiment, while the first autonomous driving mode is being executed, the parameter changing unit 16 changes at least a part of the control parameter used by the driving control unit 15 to execute autonomous driving to a control parameter for executing the second autonomous driving mode.

The parameter changing unit 16 changes a parameter for causing the autonomous driving vehicle V to follow the target path and the target speed of the autonomous driving vehicle V as a control parameter to be changed. As the control parameter, various parameters used for controlling the autonomous driving vehicle V to follow the target path and the target speed can be used. As an example, the control parameter to be changed may be a feedback gain for a deviation of an actual speed with respect to a target speed of the autonomous driving vehicle V. For example, the control parameter to be changed may be a feedback gain with respect to a deviation of an actual acceleration from a target acceleration of the autonomous driving vehicle V. As an example, the control parameter to be changed may be a feedback gain for a deviation of an actual lateral position or yaw angle with respect to a target path of the autonomous driving vehicle V.

In addition, as an example, the control parameter to be changed may be a weight coefficient for a deviation of an actual speed with respect to a target speed of the autonomous driving vehicle V, which is used when the driving control unit 15 controls the speed of the autonomous driving vehicle V to be the target speed through the optimizing calculation.

As an example, the control parameter to be changed may be a weight coefficient for deviation of actual acceleration with respect to target acceleration of the autonomous driving vehicle V, which is used when the acceleration of the autonomous driving vehicle V is controlled to be the target acceleration through the optimized calculation. As an example, the control parameter to be changed may be a weight coefficient for a deviation of an actual lateral position or yaw angle with respect to a target path of the autonomous driving vehicle V, which is used when the lateral position or yaw angle of the autonomous driving vehicle V is controlled to be along the target path through the optimized calculation.

As an example, the control parameter to be changed may be a control width allowed for the target trajectory of the autonomous driving vehicle V. That is, the control width includes an allowable width of the deviation of the position of the autonomous driving vehicle V with respect to the target path included in the target trajectory, and an allowable width of the deviation of the speed of the autonomous driving vehicle V with respect to the target speed included in the target trajectory. For example, the parameter changing unit 16 may change at least one of the above-described various control parameters.

The travel performance of the second autonomous driving mode is higher than that of the first autonomous driving mode. That is, in the second autonomous driving mode, it is necessary to follow the target control value (target speed, target path, and the like) with higher accuracy. Therefore, as in the above-described example, the parameter changing unit 16 changes the feedback gain and the weight coefficient to improve the followability to the target control value.

When it is determined that the autonomous driving vehicle V enters the second operation area from the first operation area due to the travel area determination unit 13, the parameter changing unit 16 changes the control parameter. Here, the parameter changing unit 16 gradually (or stepwise) changes the value of the control parameter.

After the control parameter is changed due to the parameter changing unit 16, the performance determination unit 17 determines whether the travel performance of the autonomous driving vehicle V corresponding to the changed control parameter satisfies the travel performance required for the high-level autonomous driving mode. Here, the high-level autonomous driving mode is the second autonomous driving mode as described above. The travel performance of the autonomous driving vehicle V corresponding to the changed control parameter is a travel state that changes in association with the change of the control parameter. For example, when the control parameter related to the speed is changed, the travel performance of the autonomous driving vehicle V corresponding to the changed control parameter may be the speed of the autonomous driving vehicle V.

As an example, the travel performance used in the determination may be the deviation of the actual speed relative to the target speed of the autonomous driving vehicle V. As an example, the travel performance used in the determination may be a deviation of an actual acceleration relative to a target acceleration of the autonomous driving vehicle V. As an example, the travel performance used in the determination may be a deviation of an actual lateral position or yaw angle with respect to the target path of the autonomous driving vehicle V. As an example, the travel performance used for the determination may be stability of path following control when the path of the autonomous driving vehicle V is controlled so as to be the target path included in the target trajectory of the autonomous driving vehicle V. As an example, the travel performance used for the determination may be stability of speed following control when the speed of the autonomous driving vehicle V is controlled so as to be the target speed included in the target trajectory of the autonomous driving vehicle V. As an example, the performance determination unit 17 can perform the determination using at least one of the various types of travel performances described above.

The various deviations described as travel performance are physical values obtained based on the target control value and the actual observed value. In addition, as stability of path following control described as travel performance, an observed physical value such as a convergence time and an overshoot amount of a deviation (lateral deviation) of an actual lateral position from a target lateral position may be used. As stability of the speed following control described as travel performance, an observed physical value such as a convergence time and an overshoot amount of a deviation of an actual speed from a target speed may be used. Alternatively, as the stability of the following control and the speed following control, a value obtained by calculating an indicator of stability such as a gain margin and a phase margin by reflecting a parameter (for example, a road surface u, a vehicle weight, a value of a control parameter to be changed, or the like) changing from moment to moment with respect to a vehicle model set in advance in the performance determination unit 17 may be used.

After it is determined that the autonomous driving vehicle V has entered the second operation area from the first operation area due to the travel area determination unit 13, the performance determination unit 17 performs the above-described determination of travel performance in a section until the autonomous driving vehicle V travels a predetermined distance. Here, a section from when the autonomous driving vehicle V enters the second operation area from the first operation area and then travels a predetermined distance is referred to as a "travel performance determination section". The performance determination unit 17 determines the travel performance when the autonomous driving vehicles V is traveling in the travel performance determination section.

Further, when the travel performance of the autonomous driving vehicle V corresponding to the changed control parameter satisfies the travel performance required for the second autonomous driving mode for a predetermined time threshold value or more, the performance determination unit 17 determines that the travel performance of the autonomous driving vehicle V satisfies the travel performance required for the second autonomous driving mode. That is, even if the travel performance required for the second autonomous driving mode is satisfied for a moment, the performance determination unit 17 does not determine that the travel performance required for the second autonomous driving mode is satisfied. When the travel performance required for the second autonomous driving mode is continuously satisfied for a predetermined time threshold value or more, the performance determination unit 17 determines that the travel performance required for the second autonomous driving mode is satisfied.

When it is determined that the travel performance of the autonomous driving vehicle V satisfies the travel performance required for the second autonomous driving mode for a predetermined time threshold value or more due to the performance determination unit 17, the driving control unit 15 switches the control of the autonomous driving from the first autonomous driving mode to the second autonomous driving mode. On the other hand, even if the autonomous driving vehicles V enter the second operation area, when the performance determination unit 17 does not determine that the travel performance is satisfied, the driving control unit 15 continues the first autonomous driving mode.

Figure 2:
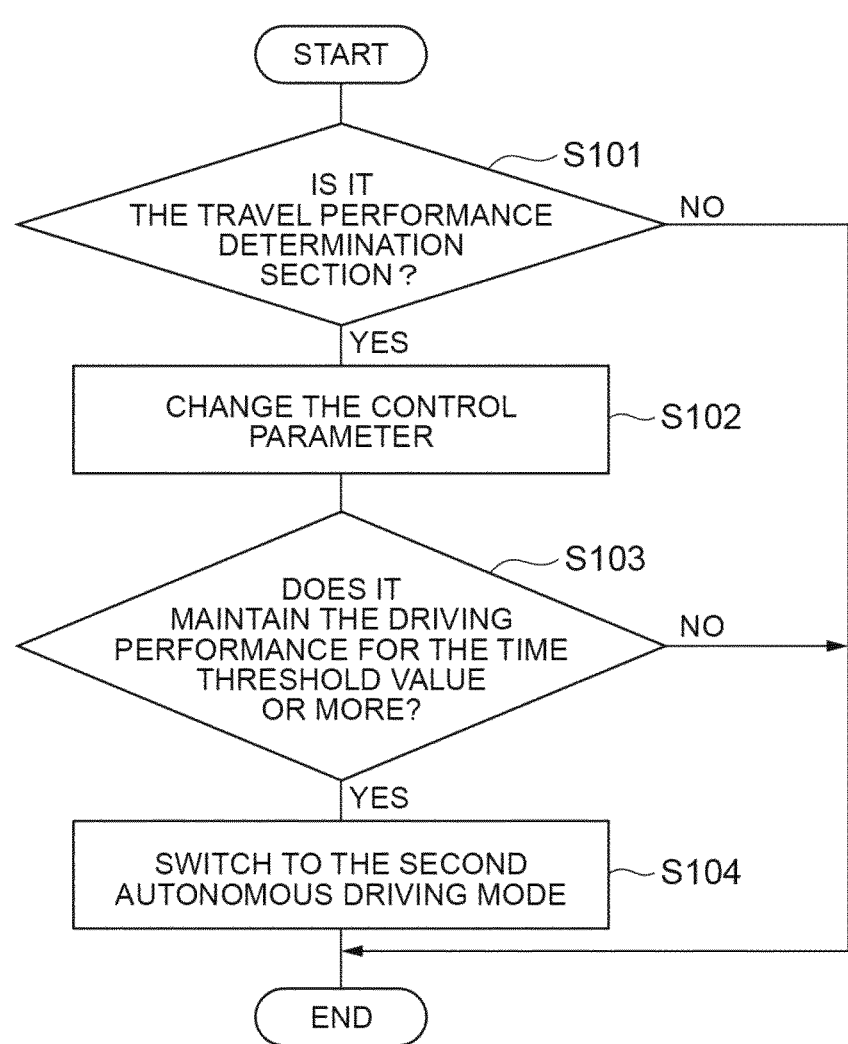
FIG. 2 is a flowchart illustrating a flow of a switching process in which the autonomous driving control apparatus switches the autonomous driving control from the first autonomous driving mode to the second autonomous driving mode.

Next, a flow of switching processing in which the autonomous driving control apparatus 1 switches the control of autonomous driving from the first autonomous driving mode to the second autonomous driving mode will be described. The flowchart shown in FIG. 2 is executed when the first autonomous driving mode is executed. When the process shown in FIG. 2 reaches the end, the process is started again from the start after a predetermined time.

The performance determination unit 17 determines whether the autonomous driving vehicle V enters a second operation area from a first operation area and the autonomous driving vehicle V is traveling in the travel performance determination section (S101). When the vehicle is not traveling in the travel performance determination section (S101: NO), the processing is started again from the start after a predetermined time. When the autonomous driving vehicle V enters the second operation area from the first operation area and travels the travel performance determination section (S101: YES), the parameter changing unit 16 changes at least a part of the control parameter to a control parameter for executing the second autonomous driving mode (S102).

The performance determination unit 17 determines whether the travel performance of the autonomous driving vehicle V corresponding to the changed control parameter satisfies the travel performance required for the second autonomous driving mode for a predetermined time threshold value or more (S103). When this condition is not satisfied (S103: NO), the process is started again from the start after a predetermined time. On the other hand, when this condition is satisfied (S103: YES), the driving control unit 15 switches the control of autonomous driving from the first autonomous driving mode to the second autonomous driving mode (S104).

Figure 3:
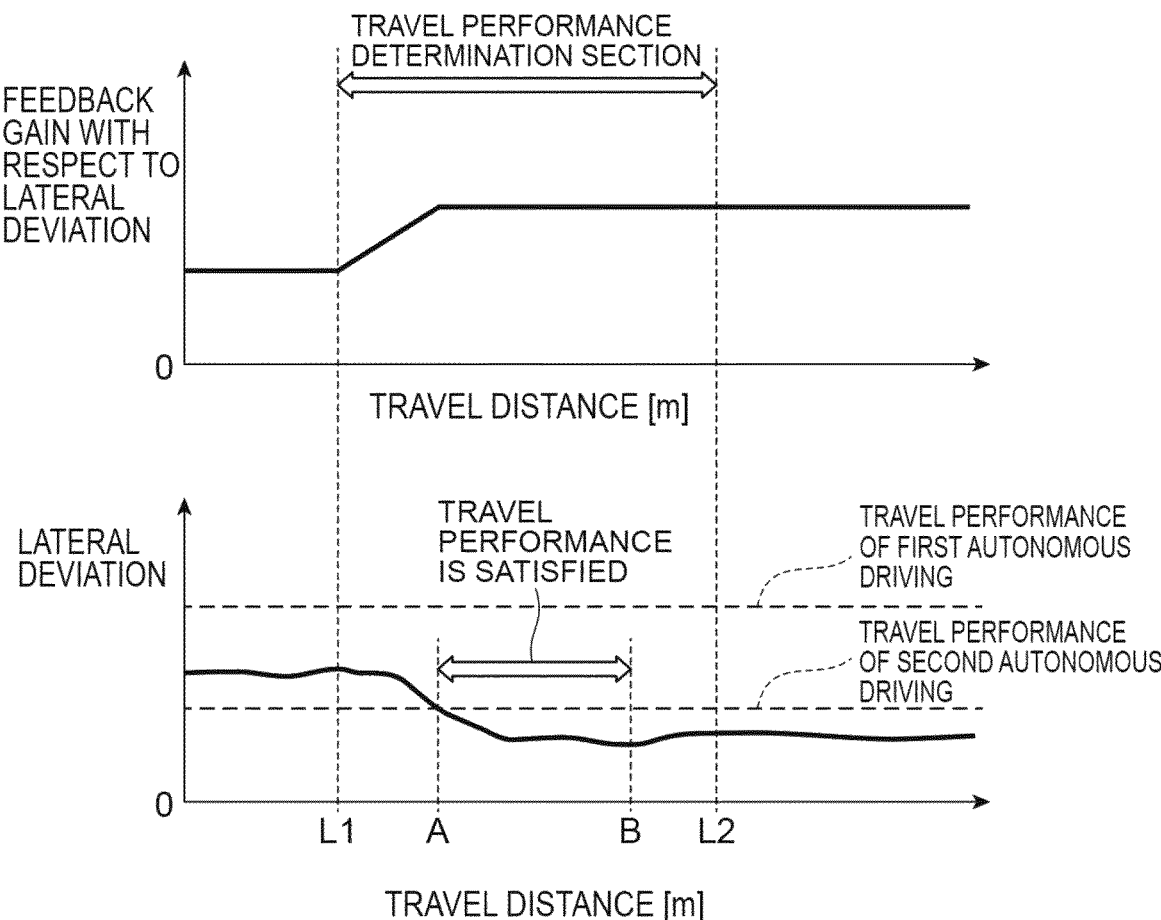
FIG. 3 is a diagram illustrating a change in each unit (value) when the control of autonomous driving is switched.

Next, a change in each unit (value) when the control of autonomous driving is switched from the first autonomous driving mode to the second autonomous driving mode will be described. Here, a deviation (lateral deviation) of a lateral position with respect to a target trajectory (target path) of the autonomous driving vehicle V will be described as an example. In FIG. 3, the lateral axis is the travel distance of the autonomous driving vehicle V. Here, it is assumed that the autonomous driving vehicle V enters the second operation area from the first operation area at a point of the L1. A section between the distances L1 and L2 is defined as a travel performance determination section. In FIG. 3, the upper graph shows a change in feedback gain with respect to lateral deviation. In FIG. 3, the lower graph shows a change in absolute value of lateral deviation.

As shown in FIG. 3, when the autonomous driving vehicle V reaches a point at a distance L1, the autonomous driving vehicle V enters the second operation area from the first operation area. That is, the autonomous driving vehicle V enters the travel performance determination section. Accordingly, the parameter changing unit 16 changes the feedback gain of the lateral deviation to the feedback gain of the lateral deviation for performing the second autonomous driving mode. Here, as shown in the upper graph of FIG. 3, the parameter changing unit 16 gradually increases the feedback gain of the lateral deviation. Due to the change in the feedback gain of the lateral deviation, the lateral deviation (absolute value) gradually decreases as shown in the lower graph of FIG. 3.

It is assumed that at the point of the distance A, the lateral deviation becomes smaller than the lateral deviation required for the second autonomous driving mode. A point of the distance B is a point where a state in which the lateral deviation is smaller than the lateral deviation required in the second autonomous driving mode continues for a predetermined time threshold or more. The performance determination unit 17 determines that the travel performance (lateral deviation) required for the second autonomous driving mode is satisfied when the autonomous driving vehicle V reaches the point of the distance B. As a result, the driving control unit 15 switches the autonomous driving control from the first autonomous driving mode to the second autonomous driving mode at the point of the distance B.

As described above, the autonomous driving control apparatus 1 changes the control parameter, and determines whether the travel performance required for the second autonomous driving mode is satisfied. When the travel performance required for the second autonomous driving mode is satisfied, the autonomous driving control apparatus 1 switches the control of autonomous driving from the first autonomous driving mode to the second autonomous driving mode. Thus, even when the control of autonomous driving is switched, the autonomous driving control apparatus 1 can appropriately run the autonomous driving vehicle V after the switching.

Further, when changing the control parameter, the autonomous driving control apparatus 1 gradually changes the value of the control parameter. As a result, the autonomous driving control apparatus 1 can suppress an abrupt change in the behavior of the autonomous driving vehicle V caused by a change in the control parameter. When the travel performance of the autonomous driving vehicle V corresponding to the changed control parameter satisfies the travel performance required for the second autonomous driving mode for a predetermined time threshold value or more, the autonomous driving control apparatus 1 determines that the travel performance of the autonomous driving vehicle V satisfies the travel performance required for the second autonomous driving mode. Accordingly, in a case where the travel performance is instantaneously satisfied, the autonomous driving control apparatus 1 can be prevented from determining that the travel performance required for the second autonomous driving mode is satisfied. Therefore, the autonomous driving control apparatus 1 can more accurately determine the travel performance.

Modification

In the above-described autonomous driving control apparatus 1, the driving control unit 15 may further switch the autonomous driving control from the first autonomous driving mode to the second autonomous driving mode based on an instruction from the driver. In this case, when it is determined that the travel performance required for the second autonomous driving mode is satisfied in the performance determination unit 17, the autonomous driving control apparatus 1 requests the driver to permit switching of the control of autonomous driving by screen display, voice, or the like. When the driver determines that the autonomous driving vehicle V is traveling with appropriate travel performance with respect to the surrounding environment in the traveling road, the driver inputs an instruction to permit switching to the second autonomous driving mode using an operation switch or the like. When an instruction to permit switching is input by the driver, the driving control unit 15 switches to the second autonomous driving mode. When an instruction to permit switching is not input by the driver, the driving control unit 15 continues the first autonomous driving mode without performing switching to the second autonomous driving mode. The autonomous driving control apparatus 1 can perform inquiry processing to the driver and reception processing of the instruction between step S103 and step S104 in FIG. 2. As a result, the autonomous driving control apparatus 1 can more appropriately switch the control of autonomous driving.

Here, the case where the driver of the autonomous driving vehicle V performs the determination of permission of switching and the input operation of an instruction has been described as an example. For example, a remote operator who remotely operates the autonomous driving vehicle V from the outside of the vehicle may perform the input operation of the determination and the instruction. In this case, the remote operator can perform the determination based on an image of a camera that captures the inside of the vehicle mounted on the autonomous driving vehicle V, an image of a camera that captures the outside of the vehicle, and the like.

Second Embodiment

Figure 4:
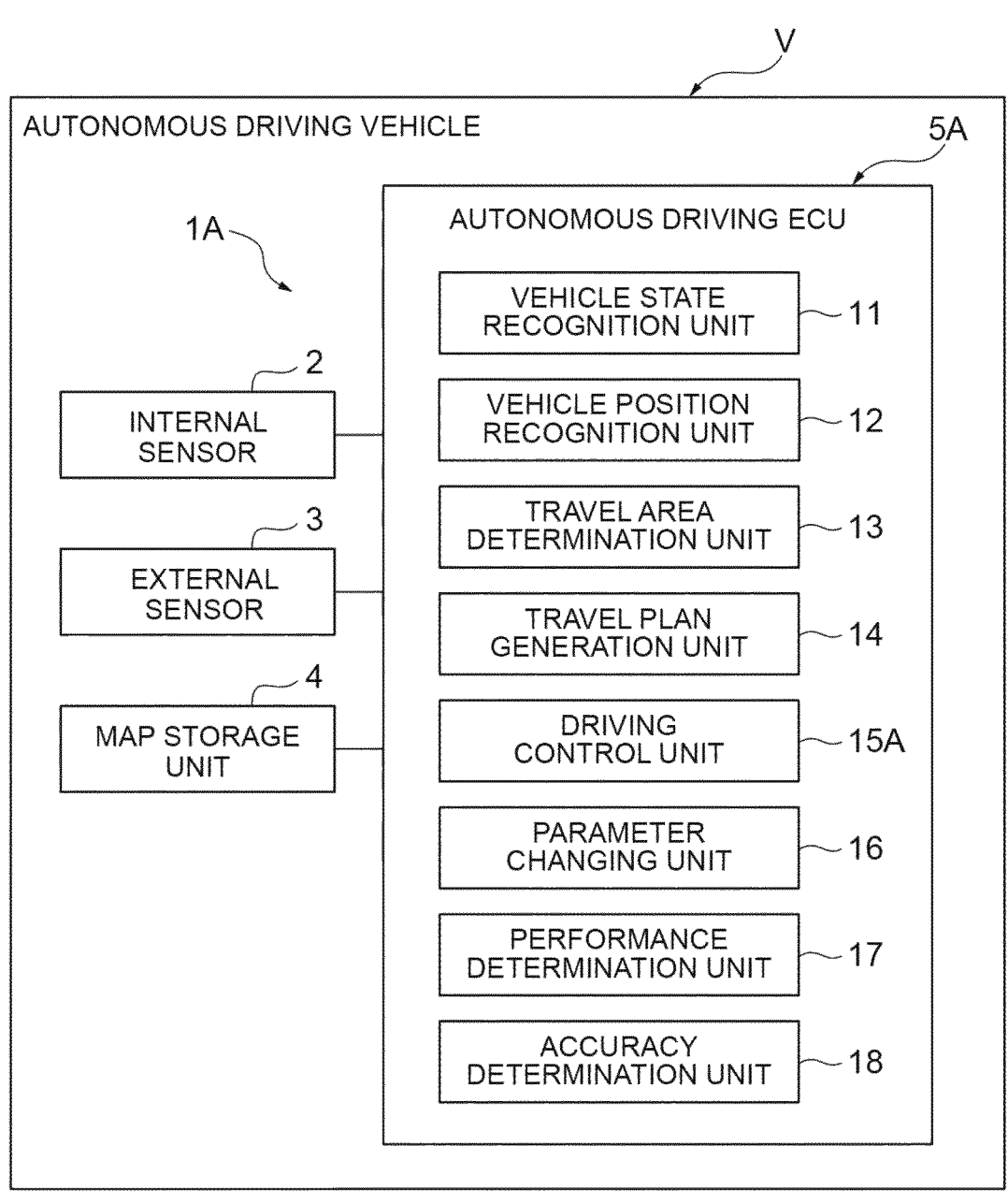
FIG. 4 is a block diagram illustrating an example of an autonomous driving control apparatus according to a second embodiment.

Next, a second embodiment of the autonomous driving control apparatus will be described. In the following description, portions different from the autonomous driving control apparatus 1 according to the first embodiment will be mainly described. An autonomous driving control apparatus 1A according to the second embodiment illustrated in FIG. 4 includes an autonomous driving ECU 5A having a different functional configuration in place of the autonomous driving ECU 5 according to the first embodiment. The autonomous driving ECU 5A is functionally different from the autonomous driving ECU 5 according to the first embodiment in that a driving control unit 15A and an accuracy determination unit 18 are provided.

The accuracy determination unit 18 determines whether or not the recognition accuracy of the external environment performed based on the external sensor 3 and the recognition accuracy of the position in the autonomous driving vehicle V recognized by the vehicle position recognition unit 12 are respectively equal to or higher than predetermined recognition accuracy. As an example, when determining the recognition accuracy of the external environment, the accuracy determination unit 18 determines the recognition accuracy based on the recognition result of the existing target set in the autonomous driving vehicle V track. Here, the accuracy determination unit 18 sets expected values of features such as a position, a size, and a shape with respect to an existing target, and compares the expected values with a recognition result of the existing target using the external sensor 3, thereby determining the recognition accuracy. For example, when a sensor in the external sensor 3 is malfunctioning or foggy, an existing target may be detected only at a position in the vicinity of the target, or a result having a different size or shape may be obtained. In this case, the accuracy determination unit 18 determines that the recognition accuracy of the external environment is low.

In addition, as an example, when determining the recognition accuracy of the position of the autonomous driving vehicle V, the accuracy determination unit 18 determines whether or not the recognition of the same position can be continued with respect to an existing target whose position is known in advance. For example, when the recognition result approaches the existing target in a state where the recognition accuracy of the position of the autonomous driving vehicle V is high, the recognition result is concentrated in a narrow range in a certain time section, and it is determined that the recognition accuracy of the position is high. The expected value of the range may be set for each existing target in accordance with the required vehicle position recognition accuracy. Here, for example, the vehicle position recognition is performed by calculating the movement trajectory of the autonomous driving vehicle V by performing integration processing using the speed of the autonomous driving vehicle V, acceleration, yaw rate, and the like. In addition, the movement trajectory correction may be performed by detecting a feature whose position is known by the external sensor 3 from the result. However, compared to this feature, the existing target increases the accuracy of determination by using a recognition target expected to have high recognition accuracy. The recognition of the existing target may be performed in a different type of the external sensor 3 from the detection of the feature.

The driving control unit 15A switches the control of autonomous driving from the first autonomous driving mode to the second autonomous driving mode when it is determined in the accuracy determination unit 18 that the recognition accuracy of the external environment and the recognition accuracy of the position are each equal to or higher than the predetermined accuracy in addition to the determination result of the performance determination unit 17.

Figure 5:
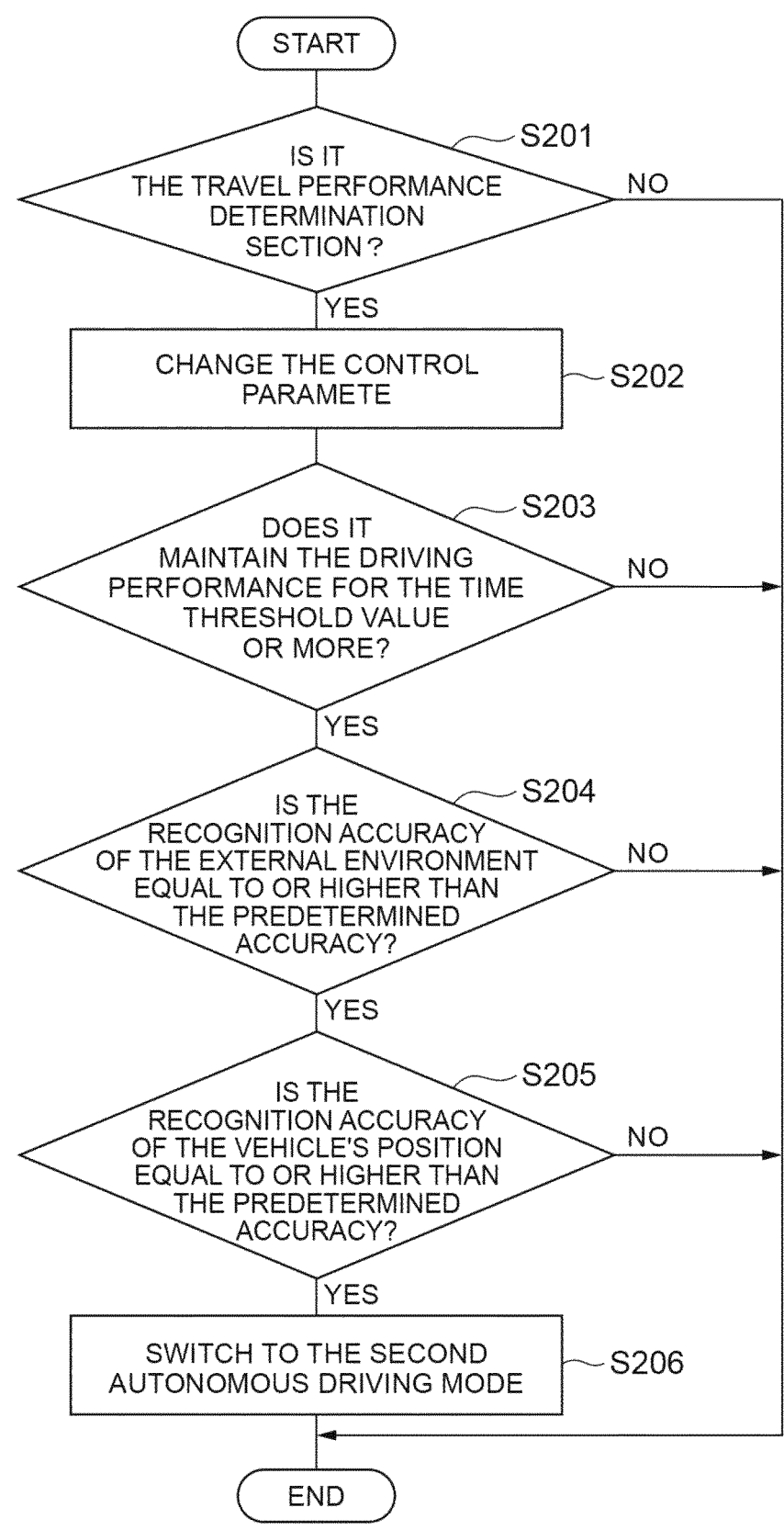
FIG. 5 is a flowchart showing a flow of switching processing in which the autonomous driving control apparatus switches the autonomous driving control from the first autonomous driving mode to the second autonomous driving mode.

Next, a flow of switching processing in which the autonomous driving control apparatus 1A switches the control of autonomous driving from the first autonomous driving mode to the second autonomous driving mode will be described. The flowchart illustrated in FIG. 5 is executed when the first autonomous driving mode is executed. When the process shown in FIG. 5 reaches the end, the process is started again from the start after a predetermined time. Since the processing of steps S201 to S204 and S206 illustrated in FIG. 5 is the same as the processing of steps S101 to S103 and S104 illustrated in FIG. 2, detailed description is omitted.

In the processing of step S203, when it is determined that the travel performance of the autonomous driving vehicle V corresponding to the changed control parameter satisfies the travel performance required for the second autonomous driving mode for a predetermined time threshold value or more (S203: YES), the accuracy determination unit 18 determines whether or not the recognition accuracy of the external environment is equal to or higher than a predetermined accuracy (S204). When the recognition accuracy of the external environment is not equal to or higher than the predetermined accuracy (S204: NO), the processing is started again from the start after a predetermined time. That is, the driving control unit 15A does not switch the autonomous driving control to the second autonomous driving mode but maintains the first autonomous driving mode.

When the recognition accuracy of the external environment is equal to or higher than the predetermined value (S204: YES), the accuracy determination unit 18 determines whether the recognition accuracy of the position of the autonomous driving vehicle V is equal to or higher than the predetermined accuracy (S205). When the recognition accuracy of the position of the autonomous driving vehicle V is not equal to or higher than the predetermined accuracy (S205: NO), the processing is started again from the start after a predetermined time elapse. That is, the driving control unit 15A does not switch the autonomous driving control to the second autonomous driving mode but maintains the first autonomous driving mode.

When the recognition accuracy of the position of the autonomous driving vehicle V is equal to or higher than the predetermined accuracy (S205: YES), the driving control unit 15A switches the control of autonomous driving from the first autonomous driving mode to the second autonomous driving mode (S206). Note that the above-described determination processing of steps S203, S204, and S205 is not limited to being executed in this order. For example, the travel performance determination process (S203) may be executed after the recognition accuracy determination process (S204 and S205).

As described above, the autonomous driving control apparatus 1A switches the control of autonomous driving in consideration of not only the travel performance after the change of the control parameter but also the recognition accuracy of the external environment and the recognition accuracy of the position of the autonomous driving vehicle V. Accordingly, the autonomous driving control apparatus 1A can more appropriately switch the control of autonomous driving in consideration of the recognition accuracy.

Although various embodiments and modifications of the present disclosure have been described above, the present disclosure is not limited to the above-described embodiments and modifications. For example, when determining travel performance, the performance determination unit 17 may determine by causing virtual pedestrians to appear on the system instead of actual pedestrians. Then, the performance determination unit 17 may determine that the travel performance is satisfied when the motion of the autonomous driving vehicle V calculated when the virtual pedestrian appears is a predetermined specified motion (speed, stopping distance, or the like).

When determining the travel performance, the performance determination unit 17 performs the determination based on whether or not the travel performance required for the second autonomous driving mode is satisfied in each of the above-described embodiments and the like. The performance determination unit 17 may change the threshold value used in this determination based on the external situation. The performance determination unit 17 can use, as the external situation, for example, a time zone (nighttime, daytime), weather (fine weather, rainy weather, or the like), a road situation (snowy road, frozen road, or the like), traffic volume, and the like. Further, when determining the travel performance, the performance determination unit 17 performs the determination based on whether or not the travel performance required for the second autonomous driving mode is satisfied by a predetermined time threshold value or more in each of the above-described embodiments and the like. The performance determination unit 17 may also change this "predetermined time threshold value" based on the external situation described above.

The parameter changing unit 16 may change the type and value of the control parameter to be changed based on the above-described external situation. The parameter changing unit 16 may change the type and value of the control parameter to be changed according to the travel situation. For example, a road shape (straight road, curved road, or the like) on which the autonomous driving vehicle V is traveling, the speed of the autonomous driving vehicle V, distances to surrounding obstacles (other vehicles or the like), and the like can be used as the travel situation. For example, in a travel situation in which the influence of the change of the control parameter on the behavior of the autonomous driving vehicle V is small (for example, in a case of traveling on a straight road at a constant speed), the parameter changing unit 16 may increase the number of control parameters to be changed and/or increase the range of change compared to a case where this situation does not occur. In addition, for example, in a case where distances to surrounding obstacles are equal to or greater than a certain value, the parameter changing unit 16 may increase the number of control parameters to be changed and/or increase the range of change compared to a case where this situation does not occur. The process of determining the number of control parameters to be changed in accordance with the travel situation and the change range may be performed between step S101 and step S102 in FIG. 2.

In the above-described embodiments and the like, the second autonomous driving mode in which the travel performance is higher than that in the first autonomous driving mode has been described as an example of the high-level autonomous driving mode. The high-level autonomous driving mode is not limited to the second autonomous driving mode. The high-level autonomous driving mode may be autonomous driving in which travel performance is higher than at least the first autonomous driving mode.

In the above-described embodiments and the like, the followability to the target control value has been described as an example of the travel performance. The travel performance is not limited thereto, and may include the ride comfort performance of the autonomous driving vehicle V. In this case, the travel performance being high can mean that the riding comfort of the autonomous driving vehicle V is good. The riding comfort performance can be expressed using various riding comfort indexes.

In the above-described embodiments and the like, the case where the autonomous driving control apparatus 1 and 1A control autonomous driving of the autonomous driving vehicle V has been described as an example. However, the present invention is not limited thereto, and the autonomous driving control apparatus 1 and 1A may control a movable object other than the autonomous driving vehicle V that can autonomously drive.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. An autonomous driving control apparatus for controlling autonomous driving of a movable object, the apparatus comprising:

a memory that stores a program;

a processor configured to execute the program to:

execute, as control of the autonomous driving, a first autonomous driving mode and a second autonomous driving mode having travel performance higher than that of the first autonomous driving mode;

while the first autonomous driving mode is being executed, change at least a part of a control parameter for performing the autonomous driving to the control parameter for performing a high-level autonomous driving mode having a travel performance higher than that of the first autonomous driving mode;

while the first autonomous driving mode is being executed, determine whether a travel performance of the movable object corresponding to the changed control parameter satisfies a travel performance required for the high-level autonomous driving mode for a time period that is at least equal to a predetermined time threshold after the control parameter is changed; and switch the control of the autonomous driving from the first autonomous driving mode to the second autonomous driving mode based upon the determination that, while the first autonomous driving mode is being executed, the travel performance of the movable object satisfies the travel performance required for the high-level autonomous driving mode.

2. The autonomous driving control apparatus according to claim 1, wherein the processor changes, as the control parameter to be changed, a target path of the movable object and a parameter for causing the movable object to follow target speed.

3. The autonomous driving control apparatus according to claim 1, wherein the processor gradually changes a value of the control parameter.

4. The autonomous driving control apparatus according to claim 1, wherein the processor determines the travel performance using a deviation of an actual lateral position or yaw angle with respect to a target path of the movable object.

* * * * *